United States Patent

[11] 3,603,444

[72] Inventors James L. Chengges
 Trumbull, Conn.;
 Benjamin F. Hart, Ballston Lake, N.Y.
[21] Appl. No. 869,121
[22] Filed Oct. 24, 1969
[45] Patented Sept. 7, 1971
[73] Assignee General Electric Company

[54] HIGH-SPEED SORTING DEVICE
 8 Claims, 5 Drawing Figs.
[52] U.S. Cl. .................................................. 198/24
[51] Int. Cl. .......................................... B65g 47/88
[50] Field of Search ............................... 192/12 R,
 12 D; 198/24, 27

[56] References Cited
 UNITED STATES PATENTS
2,702,016 2/1955 Reece ..................... 192/12.2

3,151,727 10/1964 Glaubke ..................... 198/24
3,195,709 7/1965 Physioc ...................... 198/27

Primary Examiner—Joseph Wegbreit
Attorneys—Paul A. Frank, John F. Ahern, Julius J.
 Zaskalicky, Joseph B. Forman, Frank L. Neuhauser and
 Oscar B. Waddell ABSTRACT: A hollow diverter pin is sinusoidally reciprocated, to selectively divert articles from a main conveyor, by a crank driven by a trip release one-way clutch and a continuously rotating motor. The clutch will engage and rotate the crank to a new position of the diverter pin, where a solenoid actuated trip disengages the clutch. With the disengagement of the clutch, a positive brake is also set by means of the solenoid to firmly position and hold the diverter pin in its new position.

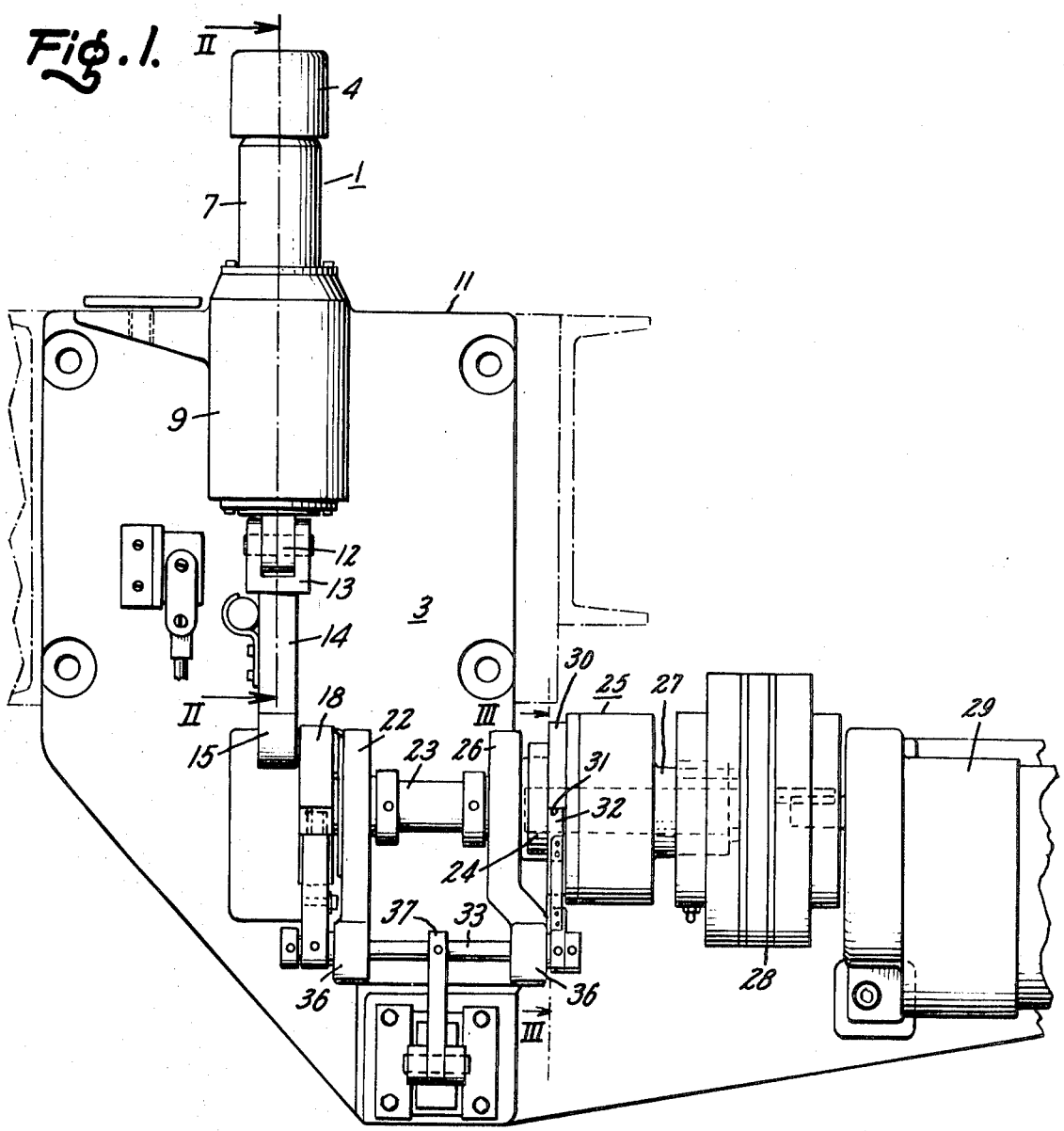

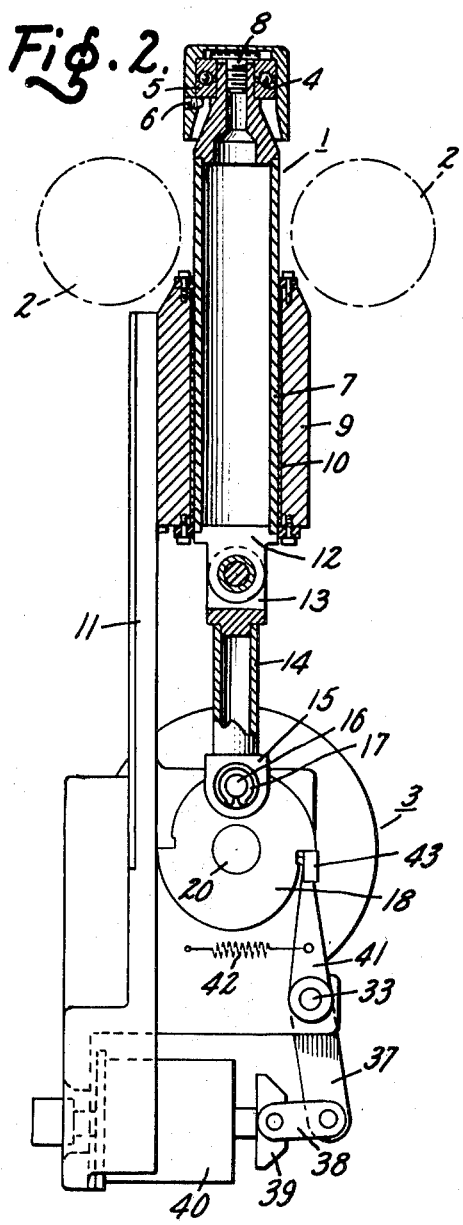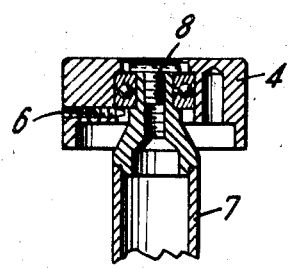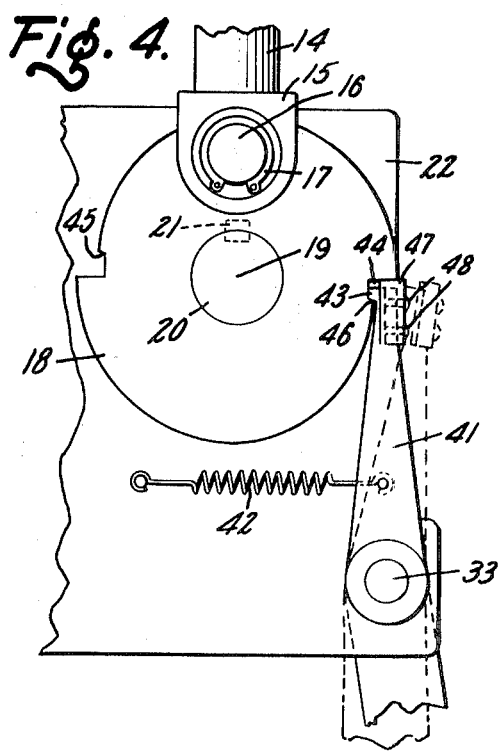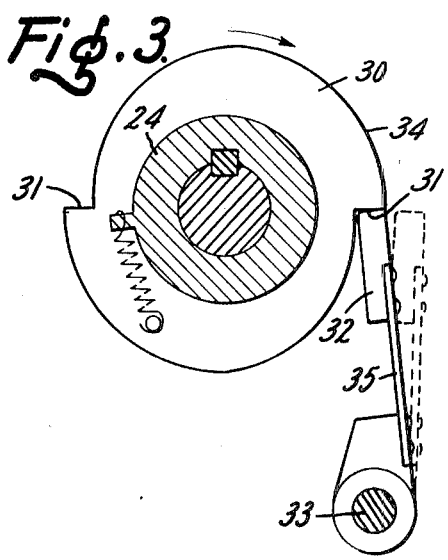

HIGH-SPEED SORTING DEVICE

The diverter pin and actuating assembly of the present invention is to be used in combination with the conveyor sorting system disclosed U.S. Pat. No. 3,512,638 "High Speed Conveyor Sorting device," James L. Chengges and Frank L. Denzler and assigned to the assignee of this invention.

High-speed conveyor sorting devices are known wherein articles traveling at a high speed along a main supply conveyor are moved into at least two different classifications where they are moved by different high speed conveyors to two differently classified receiving areas. In modern warehousing systems utilizing high-speed conveyors for transporting articles to different warehouse storage areas, distribution points, etc., there is a need to separate off from a main or master conveyor path certain articles which are to be sorted out and diverted to a particular warehouse storage area, distribution point, etc. The closer a sorting area is to the supply of articles, the more difficult the problem becomes because the articles are closely spaced together and traveling at a high speed. This produces the corollary requirement that sorting devices used at such points must operate at extremely high speeds in order to process the large number of articles if the conveyor system is to operate at maximum efficiency.

Diverting means used in the past have the considerable disadvantages of large mass and correspondingly slow speeds of effective operation. Also, the actuating mechanisms employed have produced considerable problems with respect to speed, shocks involved in moving the diverter means, vibrations during operation, and insufficient response.

It is the primary object of the present invention to overcome the above-noted disadvantages of the prior art and to improve upon the advantageous conveyor system set forth in U.S. Pat. No. 3,512,638.

The diverter pin is provided with a rotatably mounted cap which is simple in construction and rigid in operation to provide for frictionless guiding of the articles to be sorted so that there will be no undue delays in the sorting operation. The diverter pin and its crank-connecting rod are basically tubular for maximum strength involving a particular mass. The reciprocating or oscillating parts of the actuating mechanism, being tubular, have the combined advantage of low inertia necessary for high-speed operation.

A continuously rotating motor is provided for ultimate response to actuate the diverter pin through the means of a one-way clutch employing a trip release, which release employs two abutments corresponding to the two positions of the diverter pin for engagement with a trip pawl controlled by a solenoid. The final positions of the diverter pin are determined accurately and held firmly by means of a positive brake actuated by the same solenoid. The rotary portions of the actuating mechanism have relatively low inertia and are quite simple in determining the two positions of the diverter pin. Also, the solenoid control blends well with electronic control systems needed for determining which articles are to be diverted.

Other objects, features and advantages of the present invention will become more clear from the following description of the drawing, wherein:

FIG. 1 is an elevation view of the sorting device of the present invention showing the diverter pin in its upper operative position;

FIG. 2 is a partial cross-sectional elevation view taken along line II—II of FIG. 1;

FIG. 3 is a cross-sectional view of the clutch taken along line III—III of FIG. 1;

FIG. 4 is an enlarged view of a portion of FIG. 2 showing the engaged brake; and FIG. 5 is an enlarged portion of FIG. 2 showing details of the article engaging cap.

The sorting system of the above-mentioned copending application includes a main conveyor comprising a plurality of parallel axes, driven rollers for normally conveying a plurality of articles along its conveyor path, in combination with one or more diverter pins that are moved from a position below the rollers to a position between and above the rollers wherein they will guide the articles away from the main conveyor path and on to a second conveyor. Thus when the diverter pin is in its lower position, the articles are conveyed along the main conveyor path, and when the diverter pin is raised to its upper position, the articles or material are moved away from the main conveyor path and are diverted onto another conveyor. The diverter pin and actuating mechanism of the present invention provide a quick and smooth response of the diverter pin for movement between its two positions so that it may be used with high-speed conveyors in an accurate and satisfactory manner.

In FIGS. 1 and 2, the diverter pin 1 is shown in its raised position, that is, extending above the driven conveyor rollers 2. There may be one diverter pin, but it is preferable to employ a plurality of diverter pins as set forth in the above-mentioned copending application; however, only one diverter pin and its actuating mechanism 3 will be described and shown in detail because it is understood that if more diverter pins are employed, each will be constructed in an identical manner with identical independent actuating mechanisms.

At the upper end of the diverter pin 1, there is an inverted cap 4 which is rotatably mounted about a vertical axis so that it may engage the articles traveling on the driven rollers 2 without material friction that would otherwise interfere with the high-speed operation of the conveying device. The inverted cap 4 supportingly engages the upper race of a radial and thrust ball bearing 5; a set screw 6 extends radially through at least one sidewall of the cap 4 beneath the lower race of the ball bearing 5 to prevent unintentional removal of the cap 4. The main body 7 of the diverter pin 1 is tubular to provide sufficient strength and reduce the inertia of the diverter pin. The upper end of the main body 7 is provided with a reduced diameter portion telescopically engaged within the ball bearing 5, a shoulder supportingly engaging the lower race of the bearing 5 and a central threaded bore receiving therein a machine screw 8 for holding the bearing 5 in the indicated position. Preferably, this upper end of the diverter pin is a separate, machined piece welded or the like to a tube forming the central portion of the pin.

The main body 7 is slidably mounted for reciprocation along its vertical axis in the sleeve bearing 9, which may be provided with an antifriction liner 10 secured by suitable bolts. The sleeve bearing 9 is rigidly secured to a stationary mounting plate 11.

To move the diverter pin 1 upwardly and downwardly with a sinusoidal velocity curve characteristic as plotted with respect to the vertical distance between its upper and lower positions, the actuating mechanism 3 is provided with a crank and connecting rod assembly as follows. An ear 12 depends rigidly from the lower end of the tubular body 7 and has a bore extending horizontally therethrough. A U-shaped bracket 13 interengages with the ear 12 and is provided with opposed bores aligned with the bore of ear 12. A suitable bearing-type connecting pin is inserted and held within the aligned bores of the ear 12 and bracket 13 to provide a pivotal connection therebetween. The web portion of the bracket 13 is provided with an integral rigid depending intermediate member 14 which is tubular to reduce its inertia. An eyelet bearing 15 is rigidly secured to the lower end of the intermediate member 14 for telescopic bearing reception of a pin 16 and held thereto by means of a snap washer 17 in a conventional manner. The horizontally extending pin 16 is secured in a cantilevered manner to one radial face of a crank plate 18 at a radial distance spaced from the axis of rotation 19. In this manner, the eyelet bearing 15, intermediate member 14 and bracket 13 form a connecting rod pivotally mounted at its opposite ends to the crank plate 18 and the lower end of the diverter pin 1.

The crank plate 18 is mounted for rotation on a shaft 20 by means of a suitable key 21. A bearing block 22 is rigidly secured on the mounting plate 11 for rotatably supporting the shaft 20. A sleeve-type coupling 23 is employed for a driving connection between the shaft 20 and the output member 24 of a clutch 25, which output member 24 is rotatably mounted in a bearing block 26 rigidly secured to the mounting plate 11. The input member 27 of the clutch 25 is drivingly connected by means of a conventional, flexible and shock-absorbing coupling 28 to a source of power, preferably an electric motor 29.

Thus, the motor 29 will drive through the flexible coupling 28, the clutch 25 and the coupling 23, to rotate the crank plate 18 and reciprocate the diverter pin 1 through the intermediary of the connecting rod 13–15. The resulting sinusoidal motion of the diverter pin 1 is quite advantageous in that the main portion of the distance between the two end positions of the diverter pin is traversed with rapid velocity, with the approach to the final pin positions being gradual and progressive to reduce shocks and vibrations for high-speed conveyor work. Also, the tubular construction of the connecting rod 13–15 and the diverter pin reduces the inertia of the reciprocating parts. The main mass of the actuating mechanism is subjected to only rotary motion so that inertia will not be a problem for high-speed work.

The actuating mechanism is provided with controls to automatically stop the diverter pin 1 at its raised position as shown in FIGS. 1 and 2 and its lowered position corresponding to a 180° rotation of the crank plate 18. For this purpose, the clutch 25 is preferably an automatically engaging one-way clutch with a trip release, with reference being made to U.S. Pat. No. 2,140,737 for a more detailed description of this clutch, the disclosure of which patent is incorporated herein in its entirety by reference. This clutch employs a trip release member 30 having two diametrically opposed trip abutments 31 for selective engagement with the trip pawl 32. In the known manner of such clutches, the trip release member 30 is mounted on the output member 24 for limited relative rotation against the bias of the spring mounted between the members 24 and 30.

When it is desired to change the position of the diverter pin 1, the trip pawl 32 is momentarily moved to its dotted line position in FIG. 3 by clockwise rotation of shaft 33 to release the trip release member 30 and thus automatically engage the clutch. As soon as the clutch is engaged, the shaft 33 is rotated in the counterclockwise direction to return it to its former full line position and the pawl 32 engages the peripheral cam face 34 of the release member 30 flexing the leaf spring 35. UPon further clockwise rotation of the trip release member 30, with the clutch engaged, the trip pawl 32 moves inwardly towards its full line position until abutment between the trip pawl 32 and the next abutment 31 takes place after 180 180° rotation of the member 30, which corresponds to 180° rotation of the crank plate 18 and movement of the diverter pin 1 from one of its positions to its other position. When the abutment 31 strikes the trip pawl 32 to stop the trip release member 30 for disengagement of the clutch (as in the case of the clutch shown in U.S. Pat. No. 2,140,737) the motion of the roller cage which is carried by member 24, is stopped to move the rollers out of wedging engagement with the cooperating wedging surfaces formed on the relatively rotatable input and output members 27, 24.

The pawl shaft 33 is rotatably mounted in spaced bearings 36, which are secured to the mounting plate 11 as shown in FIG. 1. One end of an actuating lever 37 is rigidly secured to the central portion of the shaft 33, as shown in FIGS. 1 and 2, and the other end of the actuating lever is pivotally secured to an intermediate link 38. The link 38 is also pivotally connected to the movable shaft 39 of a solenoid 40. Solenoid 40 is provided with a suitable conventional screw adjustment and is rigidly secured to the mounting plate 11. In the position of FIG. 2, the solenoid 40 is deenergized and its movable shaft 39 is extended by means of the link 38, lever 37, shaft 33 and the additional pawl 41 which is spring urged in the counterclockwise direction as viewed in FIG. 2, by means of spring 42. When the solenoid 40 is energized, the movable shaft 39 is retracted to the left as viewed in FIG. 2, which causes counterclockwise rotation of the shaft 33 as viewed in FIGS. 2 and 3 against the action of the spring 42 to urge the trip pawl 32 toward its full line position, which when reached will disengage the clutch 25.

Due to the nature of the trip release one-way clutch, there is some relative movement between the output member 24 and the trip release member 30 after the trip pawl 32 has engaged the abutment 31, which will result in a small amount of further movement of the crank plate 18. To precisely and accurately arrest the movement of the crank plate 18 to prevent any vertical vibrations of the diverter pin 1, a positive brake is employed as shown particularly in FIG. 4. The additional pawl 41 that is mounted for movement with the shaft 33 has at its outer end a brake finger 43 for engagement within the correspondingly formed two recesses 44 on the periphery of the crank plate 18 at diametrically opposed positions corresponding to the upper and lower positions of the diverter pin 1.

When the abutment 31 strikes the clutch trip pawl 32 for disengagement of the clutch, the corresponding position of the brake finger 43 is on the peripheral surface of the crank plate 18. When rotation of the trip release member 30 has been arrested by means of the pawl 32, the clutch 25 is disengaged and there is a small further rotational movement of the clutch output member 24 and thus a small additional rotational movement of the directly connected crank plate 18, which additional rotational movement causes the brake finger 43 to enter into the adjacent recess 44. With entry of the brake finger 43 into the recess 44, cam surfaces 45 on the periphery of the crank plates 18 and 46 on the brake finger 43 cooperate further to rotate the crank plate 18 under the influence of spring 42 firmly seat the brake finger 43 within the recess 44. Any play between the recess 44 and the brake finger 43, in full engagement as shown in FIG. 4, may be taken up by means of stop plate 47 adjustably mounted by screws 48 on the end of the pawl 41 so that the stop plate 47 is in abutment with the side of the recess 44 opposite from the cam surface 45 when the cam surfaces 45 and 46 are in full tight engagement. This tight engagement between the brake finger 43 and the recess 44 accurately positions the diverter pin and firmly holds the diverter pin against vibrations, particularly when it is further realized that the usual one-way clutch employs a spring, as shown in FIG. 3, urging rotation of the output member 24 relative to the release trip member 30, which in this case urges the crank plate 18 in the counterclockwise direction as viewed in FIG. 4 so that there is firm engagement between the abutting surfaces of the brake finger 43 and the recess 44.

With the diverter pin in the upper position shown in FIGS. 1 and 2 and with the brake and clutch mechanisms being in the full line positions of FIGS. 4 and 3 respectively, the diverter pin diverts articles from the main conveyor to the side conveyor as set forth in the above-mentioned copending application.

If it is desired to have the next article continue on the path of the main conveyor, the diverter pin is withdrawn by a suitable control signal developed by the control circuit described in copending application Ser. No. 869,120 entitled "Control Circuit for Automatic Switching Conveyor"—D. F. Littlefield, Inventor, filed concurrently with this application and assigned to the assignee of this invention. The control signal is supplied to the solenoid 40 to energize it and retract the shaft 39 to the left as shown in FIG. 2. With this retraction, the link 38 and lever 37 will rotate the shaft 33 in the clockwise direction to correspondingly move the pawls 41 and 32 in the clockwise direction out of engagement with their respective abutments. With disengagement of the trip pawl 32, the clutch 25 automatically engages and with disengagement of the pawl 41 the brake is released to allow movement of the crank plate 18. Thus, the continuously rotating motor 29, by means of the coupling 28, engaged clutch 25, and coupling 23 rotates the crank plate 18 clockwise. Before 180° movement of the crank plate 18, the control signal to the solenoid 40 is discontinued so that the spring 42 acting on the pawl 41 moves shaft 33 and pawls 41, 32 in the counterclockwise direction so that the pawl 41 will engage on the peripheral surface of crank plate 18 and the pawl 32 will engage in the peripheral cam face 34. Upon further rotation, the abutment 31, shown in FIG. 3, first strikes the trip pawl 32 to release the clutch 25. Thereafter there will be a small additional rotational movement of the output member 24 of the clutch 25 to provide a correspondingly small additional rotation in the clockwise direction of the crank plate 18, as shown in FIG. 4, to bring the brake finger 43 into firm engagement with the corresponding recess 44 to firmly and accurately position the diverter pin 1 in its new lower position below the rollers 2, which new position is not shown in the drawings.

To reposition the diverter pin 1 in its upper position as shown in FIG. 2, an additional brief control signal would be sent to the solenoid 40 to provide for another 180° rotation of the crank plate 18 in a manner identical to the above-described operation.

Although the particularly described elements are most important and advantageous, further modifications, variations and embodiments are contemplated within the broader aspects of the present invention. For example, a coil spring one-way clutch with a trip release could be employed.

What we claim as new and desire to secure by Letters Patent of the United States is:

1. A within device, comprising: conveyor means for normally moving material in a predetermined path; means for selectively diverting material on the conveyor means away from the one path including at least one diverter member movable between a position within the path and a position removed from the path; and mechanical means for moving said diverter member between said two positions with a sinusoidal velocity to distance characteristic over the entire distance between said two positions comprising a rotatably driven crank, and a connecting rod pivotally mounted at opposite ends between said crank and said diverter member; and means for reciprocally mounting said diverter member for movement between its positions comprising power means, a clutch driven by said power means and having actuator means for automatically disengaging said clutch after every 180° of the rotation, a brake, and a direct driving connection between said rotatable crank and said brake.

2. The device of claim 1, wherein said brake has positive engagement and said clutch is a one-way trip release clutch.

3. A sorting device, comprising: a conveyor means for normally moving material along a predetermined path; a diverter member mounted for movement between a position within the path for diverting material away from the path and a position removed from the path so as to have no effect on the material moving along said conveyor means; and means for selectively driving said diverter member between said two positions including a drive train having a serially connected source of power, a trip release automatically engaging clutch; a brake having a positive engagement; and common actuator means responsive to a selectively applied control signal for tripping said clutch and engaging said brake.

4. The device of claim 3, wherein said brake includes a rotatable member having at least one abutment; common actuator means including a shaft, a pawl drivingly mounted on said shaft for selective engagement with said clutch trip release, a second pawl drivingly mounted on said shaft for selective engagement with said brake abutment; and transducer means for converting a control signal into a rotational movement of said shaft.

5. The device of claim 4, wherein said transducer means includes a solenoid, and mechanical linkage between said solenoid and said shaft; said clutch having a rotatable input member, a rotatable output member directly drivingly connected to said brake, wedge surfaces formed between said input and output members, a plurality of rolling members operatively mounted between said wedge surfaces, a cage mounted for movement relative to said input and output members between a position permitting wedging action of said rolling members and a position preventing wedging action of said rolling members, and an abutment on said cage for selective engagement with said clutch pawl forming said trip release; a flexible coupling drivingly interposed between said clutch-input member and said source of power; said brake rotatable member including a crank pin having an axis parallel with and eccentrically spaced from the brake axis of rotation; said diverter member being mounted for reciprocation between its two positions; a connecting rod pivotally mounted at its opposite ends to said diverter member and to said crank pin, respectively.

6. The device of claim 5 wherein said clutch trip release includes a rotatable member having only two diametrically opposed abutments; said brake rotatable member having only two diametrically opposed recesses, each provided with opposed abutment surfaces for engagement with said brake pawl for stopping movement of said diverter member and preventing backlash; means spring urging said pawls toward their respective abutments for automatically and precisely stopping said diverter member after every 180° of rotation of the clutch output and brake.

7. The device of claim 3, wherein said diverter member includes a tubular central portion having a central threaded bore at its upper end, a radial and trust bearing mounted on said upper end, a screw threadably received within said threaded bore preventing removal of said bearing from said upper end, an inverted, cup-shaped, material-engaging portion enclosing said bearing and screw with said bearing supportingly interposed between said cup-shaped portion and said upper end, and a set screw radially extending through one side of said cup-shaped member preventing removal of said cup-shaped member for said upper end.

8. The device of claim 3 wherein said conveyor means includes at least two adjacent rollers for supportingly engaging the material to be sorted; said diverter member being mounted between said two rollers for movement between its two positions above and below said rollers.